United States Patent
Seger et al.

(10) Patent No.: US 9,623,600 B2
(45) Date of Patent: Apr. 18, 2017

(54) METHOD OF CONVEYING PLASTICS MATERIAL PRE-FORMS, APPARATUS FOR CONVEYING PLASTICS MATERIAL PRE-FORMS AND SWITCHING ARRANGEMENT FOR SUCH AN APPARATUS

(71) Applicant: KRONES AG, Neutraubling (DE)

(72) Inventors: Martin Seger, Neumarkt (DE); Juergen Beutl, Sinzing (DE); Johannes Vierheilig, Landshut (DE); Florian Nebl, Regensburg (DE); Christian Paul, Pentling (DE); Andreas Seidl, Donaustauf (DE)

(73) Assignee: Krones, AG, Neutraubling (DE)

( * ) Notice: Subject to any disclaimer, the term of this patent is extended or adjusted under 35 U.S.C. 154(b) by 10 days.

(21) Appl. No.: 14/614,735

(22) Filed: Feb. 5, 2015

(65) Prior Publication Data

US 2015/0231814 A1    Aug. 20, 2015

(30) Foreign Application Priority Data

Feb. 20, 2014  (DE) .................. 10 2014 102 203

(51) Int. Cl.
  *B29C 49/42*    (2006.01)
  *B65G 37/00*    (2006.01)
  *B65G 43/08*    (2006.01)

(52) U.S. Cl.
  CPC .......... *B29C 49/4205* (2013.01); *B65G 37/00* (2013.01); *B65G 43/08* (2013.01)

(58) Field of Classification Search
  CPC .................................................. B65G 49/025
  (Continued)

(56) References Cited

U.S. PATENT DOCUMENTS 4,223,778 A   9/1980  Kontz
4,356,907 A   11/1982 Aidlin et al.
(Continued)

FOREIGN PATENT DOCUMENTS

CN    101811621   8/2010
CN    102811929   12/2012
(Continued)

OTHER PUBLICATIONS

Extended European Search Report dated Jul. 8, 2015, issued in corresponding European Application No. 15155931.7.
(Continued)

*Primary Examiner* — Gene Crawford
*Assistant Examiner* — Lester Rushin
(74) *Attorney, Agent, or Firm* — Onello & Mello LLP

(57) ABSTRACT

A method of conveying plastics material pre-forms includes the plastics material pre-forms supplied to a conveying device by a supply device. The conveying device has a first roller body and a second roller body. The plastics material pre-form is conveyed between these roller bodies. A portion of the plastics material pre-forms is supported by the two roller bodies. A further portion of the plastics material pre-forms passes through between the roller bodies. At least one first value characteristic of a state of occupation of the plastics material pre-forms is detected by a first measuring instrument. A second value characteristic is detected by a second measuring instrument downstream of the first measuring instrument in the conveying direction of the plastics material pre-forms. A setting variable of the supply device or the conveying device is controlled on the basis of the two values.

16 Claims, 2 Drawing Sheets

(58) Field of Classification Search
USPC ......... 198/608, 624, 502.2, 502.3, 396, 443, 198/444, 464.1
See application file for complete search history.

(56) References Cited

U.S. PATENT DOCUMENTS

| | | | |
|---|---|---|---|
| 6,154,930 A * | 12/2000 | Verzegnassi | B65H 67/0428 19/157 |
| 6,669,005 B2 * | 12/2003 | Sandberg | B65G 21/14 198/460.2 |
| 7,491,358 B2 | 2/2009 | Gernhuber et al. | |
| 8,490,797 B2 | 7/2013 | Tanner | |
| 8,522,956 B2 | 9/2013 | Tanner | |
| 8,813,944 B2 * | 8/2014 | Tanner | B65G 47/256 198/389 |
| 2003/0034225 A1 | 2/2003 | Sandberg et al. | |
| 2004/0113326 A1 | 6/2004 | Gernhuber et al. | |
| 2011/0108468 A1 | 5/2011 | Tanner | |
| 2011/0120833 A1 | 5/2011 | Tanner | |
| 2011/0198270 A1 | 8/2011 | Beutl et al. | |
| 2013/0001139 A1 | 1/2013 | Tanner | |
| 2013/0061557 A1 | 3/2013 | Kitano et al. | |

FOREIGN PATENT DOCUMENTS

| | | |
|---|---|---|
| CN | 103569615 | 2/2014 |
| DE | 10121160 | 10/2002 |
| DE | 2009016593 | 10/2010 |
| EP | 2578504 | 4/2013 |
| GB | 812361 | 4/1959 |
| GB | 2020614 | 11/1979 |
| JP | 2008200797 | 9/2008 |
| WO | 2010006461 | 1/2010 |
| WO | 2010006462 | 1/2010 |

OTHER PUBLICATIONS

German Search report dated Feb. 13, 2015 issued in corresponding German Application No. 10 2014 102 203.3.
Chinese Office Action dated Aug. 22, 2016 issued in corresponding Chinese Application No. 20150081018.3, with English translation.

* cited by examiner

METHOD OF CONVEYING PLASTICS MATERIAL PRE-FORMS, APPARATUS FOR CONVEYING PLASTICS MATERIAL PRE-FORMS AND SWITCHING ARRANGEMENT FOR SUCH AN APPARATUS

The present invention relates to a method and an apparatus for conveying plastics material pre-forms.

DESCRIPTION OF DRAWINGS

Further advantages and embodiments are evident from the accompanying drawings. In the drawings

DETAILED DESCRIPTION

Figure 1:
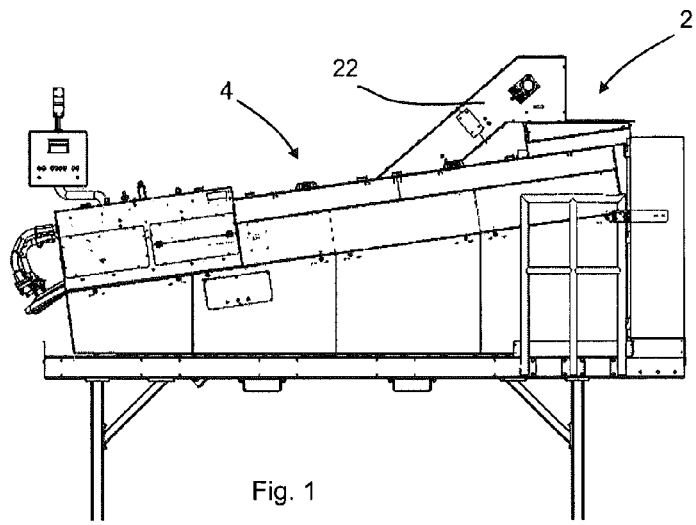
FIG. 1 is an illustration of an apparatus for conveying plastics material pre-forms.

The present invention relates to a method and an apparatus for conveying plastics material pre-forms. Apparatus of this type have long been known from the prior art. In this case it is known for the plastics material pre-forms first to be heated by means of a furnace and then to be supplied for example to a blow moulding machine which blow moulds these plastics material pre-forms into plastics material containers.

In this case these apparatus for conveying plastics material pre-forms are frequently constructed in a plurality of steps. In this way, supply devices can be provided which supply the plastics material pre-forms to a sorting device, for example a so-called roller sorter. In the prior art, in the case of a roller sorter of this type, supply belts or supply devices for the plastics material pre-forms run at a speed parameterized in a fixed manner. The respective speed is set in a fixed manner for a size of the plastics material pre-forms. In this way, a roller sorter of this type regulates depending upon the length of a sorting path with from 3 to 4 different speeds. For this type of regulation a plurality of light barriers, for example from 3 to 4, are used or required respectively in a normal case.

The problem now arises in the prior art, however, that setting these parameters for the different speeds is very time-consuming. In particular, in the course of operation deviations can occur which thus result in problems in the case of a fixed parameterization. In this way, it is possible for example that in the course of a working day the room temperature will change and therefore also the physical state of the plastics material pre-forms. The latter can then stick to a greater or lesser degree for example. In this case, however, the parameters always have to be re-adjusted. The prior art only carries out one control, however, and this can also lead to failures.

The object of the present invention is therefore to provide a method and an apparatus which will allow the possibility of a more flexible reaction to fluctuations of this type, for example also daily fluctuations. These objects are attained according to the invention by the subjects of the independent claims. Advantageous embodiments and further developments form the subject matter of the sub-claims.

In the case of a method according to the invention for conveying plastics material pre-forms, the plastics material pre-forms are supplied to a conveying device by means of a supply device and the conveying device has a first roller body and a second roller body which extend substantially parallel to each other, the plastics material pre-form being conveyed between these rollers and a portion of the plastics material pre-forms being supported by the two rollers and a further portion of the plastics material pre-forms passing through between the rollers (in particular through a gap formed between the rollers).

According to the invention at least one first value characteristic of a state of occupation of the plastics material pre-forms or a state of occupation of the apparatus with the plastics material pre-forms respectively is detected by means of a first measuring instrument and a second value characteristic of the state of occupation of the plastics material pre-forms or a state of occupation of the apparatus with the plastics material pre-forms respectively is detected by means of a second measuring instrument which is situated downstream of the first measuring instrument in the conveying direction of the plastics material pre-forms, and at least one setting variable of the supply device or the conveying device is controlled on the basis of the two values.

In particular, the aforesaid setting variable of the supply device or the conveying device is regulated. It is preferable for the characteristic value to be detected continuously by means of at least one measuring instrument, and preferably by means of two measuring instruments, and for these values to be taken into consideration in each case during the regulation of the respective setting variable.

It is advantageous for the characteristic value to be for example a number of plastics material pre-forms in a specified area detected by the measuring instrument or even a number of those plastics material pre-forms which pass this area in a certain period of time. In this way for example, the number of events which are characteristic of the occurrence of plastics material pre-forms for example can be counted within a pre-set interval by means of a measuring instrument.

In the case of a further advantageous embodiment the apparatus also has a separation device which separates out defective plastics material pre-forms or defectively positioned plastics material pre-forms. In this way, it may be possible for example for plastics material pre-forms to be conveyed not in a customary suspended position between the rollers, but recumbent for example. In this case they can be detected by the separation device and separated out of the conveying procedure.

It is advantageous for an area of the plastics material pre-forms, such as in particular a carrying ring, to be supported between the two rollers and for another area of the plastics material pre-forms, such as for example a base body, to be recumbent or to pass through a gap which is formed between the two rollers respectively.

It is therefore proposed according to the invention that a regulation of at least the supply device or the conveying device should be carried out whilst taking into consideration the two measurement values of the two measuring instruments. In this way, it is possible to react both to gradual changes or long-term changes respectively and to short-term fluctuations, for example in the metering.

In the case of an advantageous method at least one setting variable of the supply device is controlled on the basis of both of the aforesaid values. It is preferable for the setting variable of the conveying device to be regulated only on the basis of one of the two measurement values or whilst taking into consideration one of the two measurement values respectively.

The setting variable of the supply device can be for example a supply rate at which the plastics material pre-forms are supplied by the supply device to the conveying device, such as for example the speed of the conveyor belts mentioned above which supply the plastics material pre-forms.

It is advantageous for at least one setting variable of the conveying device to be selected from a group of setting variables which includes a rotational speed of at least one roller body and preferably two roller bodies, an inclination of the roller bodies, a distance of the roller bodies from each other, a parallelism of the roller bodies or a segmentation of the roller bodies. These variables or parameters respectively affect the conveying speed of the plastics material pre-forms.

In this way for example, the speed of advance of the plastics material pre-forms can also be influenced by a variation in the rotational speed of the roller bodies. It is also possible, by varying the distance between the roller bodies, to alter the conveying speed since those areas with which the plastics material pre-form or the carrying ring thereof respectively rests on the two rollers are regulated by means of this distance. In addition, it would also be possible for a plurality of roller bodies to be arranged one behind the other which can also rotate at different speeds. An inclination of the roller bodies as a whole or even an inclination of individual segments (also with respect to one another) can also be altered.

In the case of a further advantageous embodiment at least one measuring instrument detects the measurement value without contact. In particular, at least one measuring instrument is an optically detecting measuring instrument and in a particularly preferred manner this measuring instrument is selected from a group of measuring instruments which includes light barriers, camera systems and the like.

In the case of a further advantageous embodiment the setting variables are regulated with at least two regulating devices. In this case it is preferable for the entire regulation to be carried out in at least two steps. It is possible in this case for a first step to equalize gradual changes or long-term changes respectively of the surroundings. This first step can be in this case an average value controller, for example a PI controller. This controller can react in this case to a nominal value of a speed of movement in each case in a manner dependent upon a plurality of measured values and, in this way, can equalize slow changes.

A further step may be a regulation which reacts to short-term fluctuations, in particular short-term fluctuations in the metering, and which creates a constant build-up point, in particular in the region of a measuring instrument, as a control aim. This can be for example a P controller.

In this case—as mentioned above—the two regulating means affect both the first and the second setting variable. The first setting variable can refer in this case to the metering unit, such as for example a vertical conveyor and attached supply belts. The second regulating unit or regulating variable respectively can refer to a build-up region or a build-up unit respectively and thus to an adjustment of the respective roller movements. It is therefore preferable for use to be made of a cascaded regulating means.

It is possible in this case for one of these regulating means, in particular the one which is provided for rapid regulation (catch-up regulator) for the two regulating means or the two setting variables respectively to react to the same output signal from the system, and in particular to an output signal of the second measuring instrument mentioned above. This same signal can also be used for the second regulating device, an average value controller, or even for two average value controllers.

In addition, however, this second regulating device can also be adjusted by way of a second output signal, namely that of the first measuring instrument. This results in an advantageous ratio between the catch-up unit and the metering unit. It is advantageous in this case for the two setting variables to be regulated in separate regulating circuits. In this case it is also possible, however, for at least one of these regulating circuits, and preferably both of these regulating circuits, to have two regulating devices connected one behind the other, it being preferable for an output signal of the first regulating device to be supplied to the second regulating device.

In this way, it is preferable for a regulating device to react as a whole to the mechanical properties of the system and it can also preferably also be adjusted to it. It is thus possible for a specific ratio to be learnt during a set-up operation and to be able to react to slow changes automatically in the course of the operation.

It can also be preferable for an evaluation of at least one regulating device to be carried out, for example a regulating device which controls the conveying device, and in particular the rollers. By means of this evaluation a quantitative basis for comparison of different properties of the rollers or even different properties of the conveying device can be produced. By means of this evaluation it is possible for at least one regulating device also to be used as a measurement system for sliding and friction properties of the rollers.

The invention thus proposes a self-learning regulation for a sorting of plastics material pre-forms, which is preferably adapted in an automatic manner to the changing conditions. In this case for example a measurement of a degree of occupation on a supply device can be measured by means of an optical sensor, and, in addition, a counting of the plastics material pre-forms can also be carried out on a supply belt, for example by means of a 3D recognition. In addition, however, a counting of the plastics material pre-forms on the supply belt would also be possible, for example by a pulse evaluation of falling plastics material pre-forms for example by means of acoustics or by means of pressure-sensitive plates. Furthermore, in the case of a preferred method a preliminary sorting and/or centring of the plastics material pre-forms is carried out with the supply device, for example by means of a supply belt.

It is preferable for figures recorded by the measuring instruments to be stored at least for a time. It is preferable for these stored measurement figures also to be capable of acting as reference values for the regulation. In the case of a further preferred method, output values of one regulating device are supplied to a further regulating device. It is particularly preferred for output signals or output values respectively of a PI controller, in particular a PI controller acting as an average value controller, to be supplied to a P controller, in particular a P controller acting as a catch-up regulator.

In the case of a further preferred method the apparatus has a return belt, in which case the latter can be used in a particularly preferred manner, by gaps in the supply belt being used in order to switch on this return belt.

It is advantageous for a degree of occupation on this supply belt to be added by means of a further measuring instrument.

In the case of a further advantageous method the regulating parameters are automatically up-dated in a manner dependent upon an ambient value, such as for example a temperature value or a moisture value. This can be carried out both in the case of the rollers and in the case of the supply belt or any return belt.

In the case of a further advantageous embodiment at least one ambient value is also measured in this way, such as, in particular, a temperature value or a moisture value.

It is preferable for an automatic up-dating of the regulating variables to be carried out with an automatic learning function.

In the case of a further advantageous method even states which are no longer capable of being regulated are recognized, and steps, such as for example an emergency stop, an ejection of plastics material pre-forms or the like, are initiated in reaction to such states which are not capable of being regulated. In this way for example, divided roller segments can be provided which permit an ejection of individual plastics material pre-forms in the event of a defect or if necessary.

The individual rollers or roller segments can be made sliding in this case, but it would also be possible for them to be driven by a pre-set contour, such as for example an imbricated or a spiral contour.

As mentioned above, a change in the parallelism of the two rollers with respect to each other can also be carried out, which can depend for example upon the advancing requirement. For this purpose it is possible for the rollers or at least one roller to be arranged on displaceable slides. It is preferable, however, for the two rollers to be moved symmetrically to each other. In this way, the actual conveyor belt of the plastics material pre-forms can be retained, which is advisable in particular with respect to conveying devices arranged downstream, such as for example conveying star wheels, conveying rails preferably with air support and the like.

In addition, it would also be possible, as mentioned above, for the pitch of the roller segments to be changed, which can likewise take place in a manner dependent upon an advancing requirement. In addition, the number of rollers or the number of the segments respectively could also be altered, in which case a further drive coupling could also be used. In this way for example, adjacent friction rollers could be provided which could also at the same time take on a supporting function in the direction of an imbalance.

In this way, it is possible for the system to adapt to the influences of the surroundings and/or the quality of the objects to be sorted and so the performance is improved as compared with present-day systems.

In the case of a further advantageous method at least one of the aforesaid regulating devices is an average value encoder or a catch-up regulator. As mentioned above, these regulating devices are advantageously arranged one after the other in this case. It is advantageous for an output value of the average value regulator to be supplied to a catch-up regulator.

The present invention further relates to an apparatus for conveying plastics material pre-forms. This apparatus has a supply device and a conveying device arranged downstream of this supply device in a conveying direction of the plastics material pre-forms, the supply device supplying the plastics material pre-forms to the conveying device, and this conveying device having a first roller body and a second roller body, which extend substantially parallel to each other, and the plastics material pre-form or plastics material pre-forms being capable of being conveyed between these roller bodies.

According to the invention the apparatus has a first measuring instrument which detects at least one first value characteristic of a state of occupation of the apparatus with the plastics material pre-forms, and a second measuring instrument which is situated downstream of the first measuring instrument in the conveying direction of the plastics material pre-forms and which detects a second value characteristic of the state of occupation of the apparatus with the plastics material pre-forms. In addition, the apparatus has a control device which controls, and in particular regulates, at least one setting variable of the supply device or the conveying device on the basis of the two values.

It is therefore also proposed with respect to the apparatus that states of occupation should be detected by means of two measuring instruments, such as for example light barriers or camera systems, positioned at different points and that at least one of the two setting variables or a drive of the supply device or the conveying device respectively should be altered with reference to these measured values.

The drive of the conveying device can be for example an electric motor which effects the rotation of one or both rollers.

The present invention further relates to a switching arrangement for controlling an apparatus for conveying containers, and in particular an apparatus of the type described above. This switching arrangement has a first controllable drive device which effects a supply of the containers to a conveying device, and a second controllable drive device which influences the conveying of the containers by means of the conveying device. In addition, the switching arrangement has a first measuring instrument which detects at least one value characteristic of a state of occupation of the apparatus with the containers, and a second measuring instrument which is situated downstream of the first measuring instrument in the conveying direction of the plastics material pre-forms and which detects a second value characteristic of the state of occupation of the apparatus with the containers.

According to the invention the switching arrangement has a first regulating device which has a regulation input, by way of which a signal of the second measuring instrument is capable of being supplied to the first regulating device, and a second regulating device which likewise has a regulation input, by way of which a signal of the first measuring instrument is capable of being supplied to the second regulating device, and an output signal of the second regulating device being capable of being supplied to the first controllable drive device.

The respective capability of being supplied is to be understood, in particular, as being that line connections or even wireless connections are present which transmit the respective signals or measurement variables respectively from the measuring instruments to the regulating device.

The drive device which effects the supply of the containers to a conveying device can be for example a drive motor which drives a supply belt. The drive device which influences the conveying of the containers by means of the conveying device can be for example a motor which drives the rollers mentioned above. It would also be possible, however, for it to be a drive device by means of which for example an inclination of the rollers can be altered or by which a parallelism of the two rollers or the like can also be altered.

In this way, it is proposed here that at least two regulating devices should be provided which control or regulate respectively the first drive device. The signals mentioned above are—as mentioned above—characteristic of a state of occupation with the containers and also constitute in each case the inputs of the regulating devices or are optionally jointly supplied or added respectively to further signals of the regulating device respectively.

As mentioned above, the containers are, in particular, plastics material pre-forms. The switching arrangement can also, however, be designed for other types of container, for example for plastic bottles, for glass bottles, for beverage cans, for container closures, beverage crates and the like. In addition, the switching arrangement can also be made available for plants which carry out packaging or palletizing of containers for example.

It is advantageous for the second regulating device to be arranged downstream of the first regulating device and, in this way, preferable for an output signal of the first regulating device to be supplied to the second regulating device. In this way, it is particularly preferred for the switching arrangement to be designed in such a way that the two regulating devices are incorporated into the same regulating circuit and preferably connected in series in this regulating circuit.

It is preferable for the first regulating device to be a PI controller and/or for the second regulating device to be a P controller. The PI controller preferably has in this case a high I-component which, in particular, relates to the production rate of the machine to be supplied. This I-component is preferably in a range of between 50 and 1,000 machine cycles.

In the case of a further advantageous embodiment the switching arrangement has still one more regulating circuit for the second drive device. This second regulating circuit preferably likewise has two serial regulating devices. It is advantageous for the first regulating circuit and the second regulating circuit to be made parallel with respect to the regulating devices. In the case of a further advantageous design the measurement signal of the second measuring instrument can be supplied twice to at least one regulating circuit and, in particular, to both a first and a second regulating device of this second regulating circuit.

In the case of a further advantageous embodiment at least one regulating device, and preferably the first regulating device, also has an input by way of which a signal of the first measuring instrument is also capable of being supplied to this regulating device. In this way, with this design of a regulating device, both the signal of the first measuring instrument and the signal of the second measuring instrument can be supplied. It is preferable for the switching arrangement to have two regulating circuits, these two regulating circuits preferably having at least two regulating devices arranged in series in each case. It is preferable, however, for a value or a measurement signal of the second measuring instrument respectively to be supplied to one regulating device of the two regulating circuits in each case.

FIG. 1 is an illustration of an apparatus for conveying plastics material pre-forms. In this case the reference number 2 refers to a supply device for supplying the plastics material pre-forms. This supply device has in this case an inclined conveyor 22 by way of which the plastics material pre-forms are supplied to a collecting container. The plastics material pre-forms pass from this supply device 2 to the conveying device 4, from which they are conveying obliquely downwards in FIG. 1. This apparatus according to the prior art has in this case a plurality of light barriers in order to control the conveying of the plastics material pre-forms.

Figure 2:
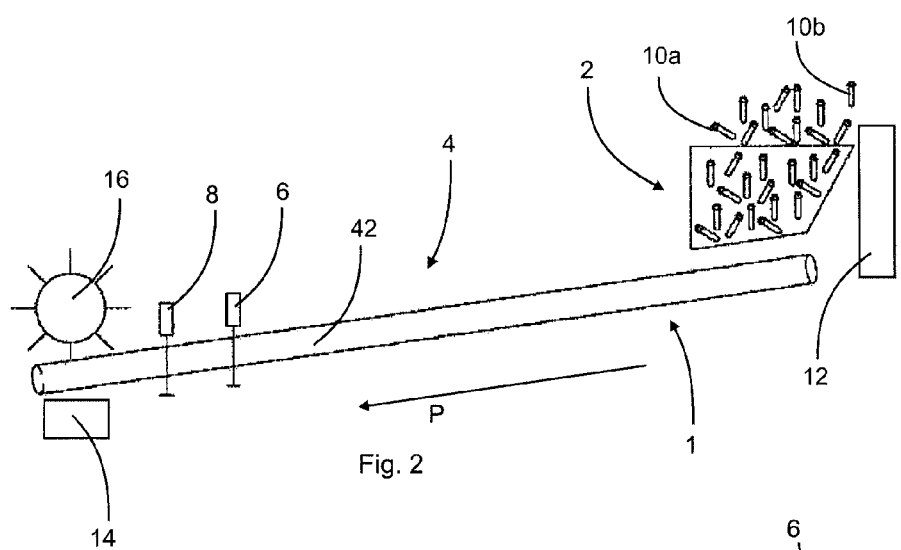
FIG. 2 is a diagrammatic illustration of an apparatus according to the invention in a first embodiment.

FIG. 2 is a diagrammatic illustration of an apparatus 1 according to the invention for conveying plastics material pre-forms 10. These plastics material pre-forms 10 have in this case a carrying ring 10a which has a greater cross-section than a main body 10b adjoining it. In this way, the plastics material pre-forms can be conveyed between two roller bodies 42 and 44 (the latter not shown). These two roller bodies 42, 44 are driven by at least one drive device 14 and during the conveying the plastics material pre-forms can slide down along these rollers in this way.

The reference number 12 designates a drive device which can control the supply of the plastics material pre-forms, for example by a supply rate being regulated.

The reference number 16 designates an ejection device which is used to eject incorrectly orientated plastics material pre-forms. This can be an ejection device which comes into contact with incorrectly orientated plastics material pre-forms and can eject them from the conveying path in this way. The reference letter P designates a conveying direction of the plastics material pre-forms 10 to be sorted or to be conveyed respectively.

The reference number 6 designates a first measuring instrument which determines a state of occupation with plastics material pre-forms in a specified area of the conveying path. This device can be for example a light barrier device which can determine how many plastics material pre-forms pass this first measuring instrument—in particular per unit of time.

The reference number 8 designates a second measuring instrument which in this case is a build-up-point light barrier. This light barrier can also measure the state of occupation in this case, this being carried out downstream with respect to the first measuring instrument. In this way, the first measuring instrument is a metering light barrier.

Figure 3:
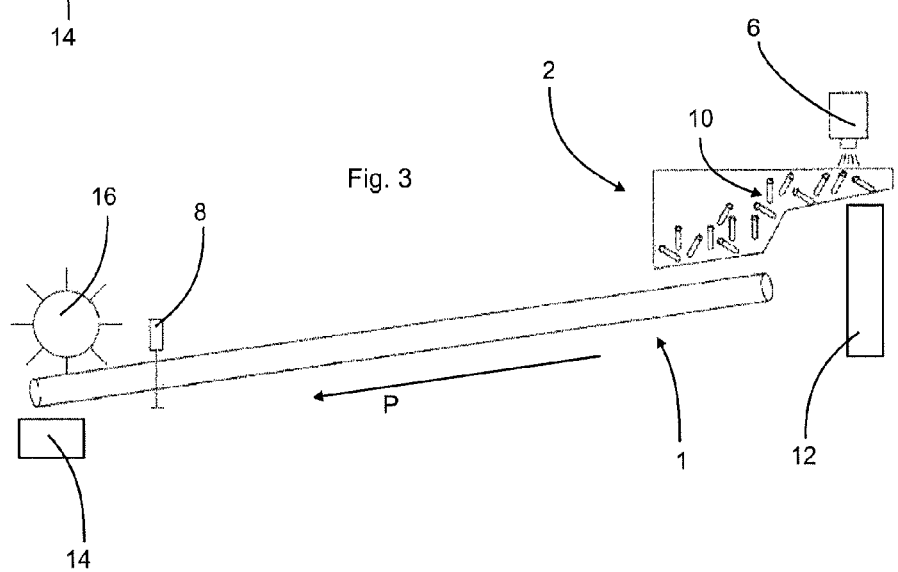
FIG. 3 is an illustration of an apparatus according to the invention in a second embodiment.

In the case of the embodiment shown in FIG. 3 the first measuring instrument is not arranged along the conveying device 4, but in a region of the supply device 2. This can be for example a camera which can deliver an image which is representative of the number of the plastics material pre-forms in the region of the supply device. The apparatus is controlled in a manner dependent upon the two signals of these two measuring instruments 6 and 8 and, in particular, both the drive device 12 and the drive device 14 are controlled.

Figure 4:
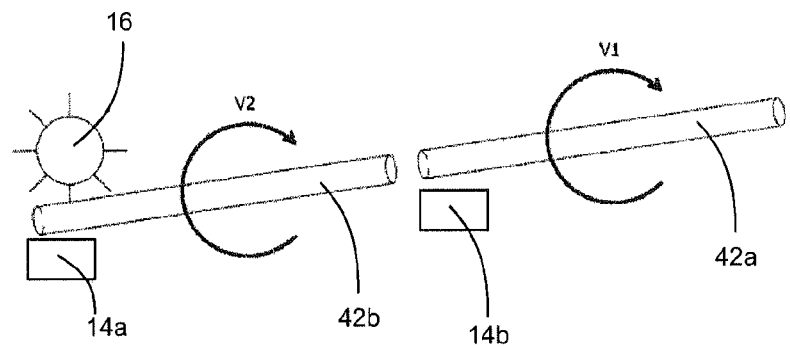
FIG. 4 is a detailed illustration to explain a roller distribution.

FIG. 4 shows a possible design of a control means of the movement sequence. In the case of this design a roller 42 is divided into two roller segments which are driven by different drive devices 14a, 14b. In this case, in particular, it is also possible to drive these segments 42a, 42b at different speeds. In this way, the conveying speed of the plastics material pre-forms can also be controlled at least locally.

Figure 5:
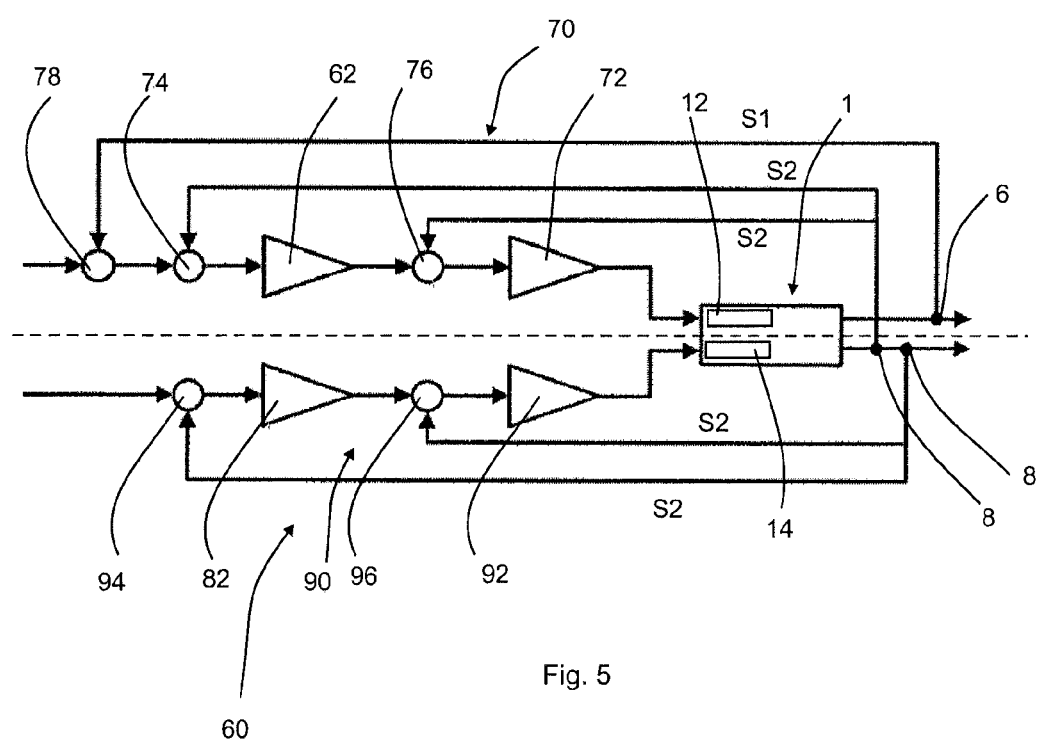
FIG. 5 is a diagrammatic illustration of a switching arrangement for controlling an apparatus of this type.

FIG. 5 is an illustration of a switching arrangement 60 for controlling the apparatus. This switching arrangement has in turn the apparatus 1 mentioned above, the two drive devices 12 and 14 also being illustrated diagrammatically. In addition, two regulating circuits 70 and 90 may be seen. The regulating circuit 70 is used for actuating the first drive device 12 and the regulating circuit 90 is used for actuating the drive device 14.

The regulating circuit 70 has a first regulating device 62 and a second regulating device 72. The first regulating device is an average value controller which is used to equalize gradual changes. The second regulating device 72 is designed in this case in the form of a catch-up controller which can react to short-term fluctuations, for example in the metering. In a corresponding manner both the measurement signals S1 of the first measuring instrument and the measurement signals S2 of the second measuring instrument 8 are supplied to the first regulating device 62. The inputs 78 and 74 are provided for this purpose. In this case the signals can be switched on or added respectively in series in each case. An output signal of the first regulating device is supplied to the second regulating device 72, the measurement signal S2 being additionally supplied once more to the second measuring instrument. The drive device 12 in turn is controlled by a output of the second regulating device 72 on the basis of these signals.

The second regulating circuit 90 has a first regulating device 82 and a second regulating device 92. In this case only the measurement signals of the first measuring instrument 6 are supplied both to the first regulating device 82 and to the second regulating device 92. This is also advisable inasmuch as the second drive device 14 is arranged downstream of the first drive device 12, and the second drive device, for example a drive for the rollers, cannot react to short-term fluctuations which are also detected, in particular, by the measuring instrument 6. In this way, the second regulating circuit 90 is not dependent, however, upon an output signal of the first measuring instrument 6.

It would also be possible, however, for a unitary regulating device or a common regulating device respectively, which performs both the tasks of the first regulating device 82 and those of the second regulating device 92, to be provided.

The Applicants reserve the right to claim all the features disclosed in the application documents as being essential to the invention, insofar as they are novel either individually or in combination as compared with the prior art.

What claimed is:

1. A method of conveying plastics material pre-forms, wherein the plastics material pre-forms are supplied to a conveying device by means of a supply device and the conveying device has a first roller body and a second roller body which extend substantially parallel to each other, and the plastics material pre-form is conveyed between these rollers, wherein a portion of the plastics material pre-forms is supported by the two rollers and wherein a further portion of the plastics material pre-forms passes through between the rollers, wherein at least one first value characteristic of a state of occupation of the plastics material pre-forms is detected by means of a first measuring instrument and a second value characteristic of the state of occupation of the plastics material pre-forms is detected by means of a second measuring instrument which is situated downstream of the first measuring instrument in the conveying direction of the plastics material pre-forms, and at least one setting variable of the supply device or the conveying device is controlled on the basis of the two values, wherein the at least one setting variable of the supply device is regulated on the basis of the two values by comparing between a measured value or a new value derived from the two values and a reference value.

2. A method according to claim 1, wherein at least one setting variable of the conveying device is selected from a group of setting variables which includes a rotational speed of the roller bodies, an inclination of the roller bodies, a distance of the roller bodies from each other, a parallelism of the roller bodies or a segmentation of the roller bodies.

3. A method according to claim 1, wherein at least one measuring instrument detects the value without contact.

4. A method according to claim 1, wherein the setting variables are regulated by means of at least two regulating devices.

5. A method according to claim 4, wherein at least one regulating device is a P controller or a PI controller.

6. A method according to claim 5, wherein output values of the PI controller are supplied to the catch-up regulator.

7. An apparatus for conveying plastics material pre-forms with a supply device and a conveying device arranged downstream of this supply device in a conveying direction of the plastics material pre-forms, wherein the supply device supplies the plastics material pre-forms to the conveying device, and wherein this conveying device has a first roller body and a second roller body, which extend substantially parallel to each other, and the plastics material pre-form is capable of being conveyed between these rollers, wherein the apparatus has a first measuring instrument which detects at least one first value characteristic of a state of occupation of the apparatus with the plastics material pre-forms, and a second measuring instrument which is situated downstream of the first measuring instrument in the conveying direction of the plastics material pre-forms and which detects a second value characteristic of the state of occupation of the apparatus with the plastics material pre-forms, and a control device which controls at least one setting variable of the supply device or the conveying device on the basis of the two values, wherein the apparatus includes a control device that regulates at least one setting variable of the supply device or the conveying device on the basis of the two values by comparing between a measured value or a new value derived from the two values and a reference value.

8. The method according to claim 1, wherein the state of occupation of the plastics material pre-forms is detected by at least one of the first measuring instrument or second measuring instrument positioned at different points, and that at least one setting variable or a drive of the supply device or the conveying device is altered with reference to the two values.

9. The method of claim 1, wherein a first regulating circuit actuates the first drive device and a second regulating circuit actuates the second drive device.

10. The method of claim 9, wherein the first regulating circuit comprises a first regulating device and a second regulating device, and wherein the first regulating device is an average value controller that equalizes gradual changes, and the second regulating device is constructed and arranged as a catch-up controller that reacts to short-term fluctuations.

11. The method of claim 10, further comprising outputting measurement signals of the first measuring instrument and measurement signals of the second measuring instrument to the first regulating device.

12. The method of claim 10, wherein an output signal of the first regulating device is output to the second regulating device, and wherein a measurement signal of the second measuring instrument is output once more to the second measuring device.

13. The method of claim 12, wherein a drive device which effects a supply of the containers to the conveying device is controlled by an output of the second regulating device on the basis of at least one of the output signal and the measurement signal.

14. The method of claim 9, wherein the second regulating circuit includes a first regulating device and a second regulating device.

15. The method of claim 14, further comprising outputting measurement signals of the second measurement instrument to both the first regulating device and the second regulating device of the second regulating circuit, and wherein an output of the measurement signal form the second regulating circuit is not dependent on an output signal of the first measuring instrument.

16. The method of claim 14, wherein a unitary regulating device or a common regulating device performs operations of the first regulating device and the second regulating device of the second regulating circuit.

\* \* \* \* \*